(12) United States Patent
DiMarco et al.

(10) Patent No.: US 8,232,680 B2
(45) Date of Patent: Jul. 31, 2012

(54) SELECTING A SINGLE AC SOURCE FOR A SWITCHING POWER SUPPLY

(75) Inventors: Robert DiMarco, Research Triangle Park, NC (US); Randhir S. Malik, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 12/643,951

(22) Filed: Dec. 21, 2009

(65) Prior Publication Data

US 2011/0148204 A1 Jun. 23, 2011

(51) Int. Cl.
*H02J 3/00* (2006.01)

(52) U.S. Cl. .............. 307/85; 307/43; 307/80; 307/86; 307/125; 307/130

(58) Field of Classification Search .............. 307/125, 307/43, 80, 85, 86, 130
See application file for complete search history.

(56) References Cited

U.S. PATENT DOCUMENTS

| | | | |
|---|---|---|---|
| 4,021,678 A * | 5/1977 | Moakler et al. ............... | 307/64 |
| 4,788,449 A | 11/1988 | Katz | |
| 5,138,184 A * | 8/1992 | Keefe ........................... | 307/64 |
| 5,739,594 A * | 4/1998 | Sheppard et al. ............. | 307/64 |
| 5,790,394 A * | 8/1998 | Cabaniss et al. ............. | 363/65 |
| 5,881,215 A * | 3/1999 | Alft ............................. | 714/14 |
| 5,939,799 A | 8/1999 | Weinstein | |
| 5,939,802 A | 8/1999 | Hornbeck | |
| 6,031,298 A | 2/2000 | Lo et al. | |
| 6,330,176 B1 | 12/2001 | Thrap et al. | |
| 6,542,023 B1 * | 4/2003 | Daun-Lindberg et al. .... | 327/460 |
| 6,608,403 B2 | 8/2003 | Liu et al. | |
| 6,630,753 B2 * | 10/2003 | Malik et al. .................. | 307/64 |
| 6,876,103 B2 * | 4/2005 | Radusewicz et al. ......... | 307/64 |
| 7,038,522 B2 | 5/2006 | Fauh et al. | |
| 7,464,292 B2 | 12/2008 | Zansky et al. | |
| 7,495,356 B2 * | 2/2009 | Kuo ............................. | 307/64 |
| 7,586,211 B2 | 9/2009 | Loffink et al. | |
| 8,004,115 B2 * | 8/2011 | Chapel et al. ................. | 307/64 |
| 2003/0080625 A1 * | 5/2003 | Malik et al. .................. | 307/85 |
| 2005/0168073 A1 | 8/2005 | Hjort | |
| 2008/0150363 A1 | 6/2008 | Kuo | |
| 2009/0019294 A1 | 1/2009 | Chen | |

OTHER PUBLICATIONS

AUS920090236PCT1_PCT/EP2010/067967_International Search Report and Written Opinion, May 11, 2011.

(Continued)

*Primary Examiner* — Adi Amrany
(74) *Attorney, Agent, or Firm* — Kunzler Needham Massey & Thorpe

(57) ABSTRACT

An apparatus, system, and method are disclosed for providing alternating current ("AC") power redundancy in power supplies. A first input module is configured to receive a first AC power input waveform. A second input module is configured to receive a second AC power input waveform. A first switch and second switch are controlled by a switching logic module to select one of the AC power input waveforms for use by a power supply. If the first AC power input waveform is present, then it is selected for use. If both the first and second AC power input waveforms are present, then the first AC power input waveform is selected for use. If only the second AC power input waveform is present then it is selected for use.

16 Claims, 6 Drawing Sheets

OTHER PUBLICATIONS

M. M. Jovanovic, "Dual AC-Input Power System Architectures," IEEE Applied Power Electronics Conf. (APEC) Proc., Dallas, TX, Mar. 10-14, 2002, pp. 584-589.

B. Morin, "Redundant Power Supply", IBM Technical Disclosure Bulletin, Jun. 1985, p. 274.

* cited by examiner

SELECTING A SINGLE AC SOURCE FOR A SWITCHING POWER SUPPLY

BACKGROUND

1. Field of the Invention

This invention relates to power supplies and more particularly relates to low cost, efficient, power supplies that provide alternating current ("AC") redundancy.

2. Description of the Related Art

A power supply, sometimes known as a power supply unit or PSU, is a device or system that supplies electrical or other types of energy to an output load or group of loads. A power supply, in some embodiments may be configured to convert power in one form to another form, such as converting AC power to direct current ("DC") power. The regulation of power supplies is typically done by incorporating circuitry to tightly control the output voltage and/or current of the power supply to a specific value. The specific value is closely maintained despite variations in the load presented to the power supply's output, or any reasonable voltage variation at the power supply's input.

For example, in an electronic device such as a computer, the power supply is typically designed to convert an AC voltage input such as is traditionally provided by a conventional wall socket, into several low-voltage DC power outputs for transmission to the internal components of the electronic device. Conversion is typically performed in stages such as a rectification stage, a pre-regulation stage such as an active harmonic filter, a regulator/chopper stage, etc. The stages may be a boost stage, a buck stage, or other derivative topology.

In some instances, redundancy of power supplies is desired to protect electronic devices from unexpected power failures. For example, two or more power supplies may be used to provide redundant DC power outputs so that in the event one power supply fails, a second or third power supply will continue to provide the necessary DC power. This is referred to as DC redundancy.

In addition to DC redundancy, some power supplies are also configured to provide AC redundancy, meaning that they receive AC input power from two or more power sources. As depicted in FIG. 1, some conventional systems require complete redundancy of two or more power supplies to provide AC redundancy. The system 100 depicts a first power supply 102 and a second power supply 104. The first power supply 102 receives an AC power waveform AC1 as an input and the second power supply 104 receives a second AC power waveform AC2 as an input. The outputs of the two power supplies 102, 104 are combined to form a redundant DC output Vout. Thus, if the AC power waveform AC1 provided to the first power supply 102 fails for some reason, the second power supply 104 continues to receive AC power from the second AC power waveform AC2, thereby providing AC redundancy protection.

In some embodiments, the first power supply 102 and the second power supply 104 may be provided in a single housing. For example, a single housing unit may include more than one AC input connector for receiving the AC power waveforms AC1, AC2. Within the single housing, the redundant power supplies 102 and 104 may be provided to receive the redundant AC power waveforms AC1, AC2 and provide an output signal Vout. However, such implementations are relatively expensive because of the cost of providing two completely redundant power supplies 102, 104.

Furthermore, another problem arises if two AC power waveforms are simultaneously applied to the input of the same power supply 102. In such a case, the two AC power waveforms may be out of phase, which can result in an overall higher voltage applied to the power supply 102. This can result a significant decrease in efficiency.

BRIEF SUMMARY

From the foregoing discussion, it should be apparent that a need exists for an apparatus, system, and method that provide AC redundancy in an efficient low cost manner. Beneficially, such an apparatus, system, and method would eliminate the need to provide completely redundant power supplies, while still maintaining efficiency of a power supply even when two redundant AC power waveforms are out of phase.

The present invention has been developed in response to the present state of the art, and in particular, in response to the problems and needs in the art that have not yet been fully solved by currently available power supplies. Accordingly, the present invention has been developed to provide an apparatus, system, and method for providing a power supply with AC power source redundancy that overcome many or all of the above-discussed shortcomings in the art.

The apparatus to provide AC power source redundancy is provided with a plurality of modules configured to functionally execute the necessary steps of using only a single AC source at a time even if two redundant AC sources are applied to the input of a power supply. These modules in the described embodiments include a first input module, a second input module, and a switching logic module. The apparatus also includes a first switch and a second switch.

The first input module may be configured to receive a first AC power input waveform from a first power source. The first input module determines whether the first AC power input waveform is present by sensing a first direct current ("DC") bias voltage generated from the first AC power input waveform. The second input module may be configured to receive a second AC power input waveform from a second power source. The second input module determines whether the second AC power input waveform is present by sensing a second DC bias voltage generated from the second AC power input waveform.

The first switch connects the first input module to a common node and the second switch connects the second input module to the common node such that a power waveform at the common node provides power to an output node. The output power is then typically passed on to additional conversion or regulation stages of a power supply.

A switching logic module controls the first switch and the second switch to determine which power waveform will be provided to the common node. The switching logic module maintains the first switch in a closed position and the second switch in an open position in response to the presence of the first DC bias voltage and the second DC bias voltage not being present. This causes power to pass from the first input module to the common node.

The switching logic module maintains the first switch in a closed position and the second switch in an open position in response to the presence of the first DC bias voltage and the presence of the second DC bias voltage. Again, this causes power to pass from the first input module to the common node.

The switching logic module maintains the first switch in an open position and the second switch in a closed position in response to the absence of the first DC bias voltage and the presence of the second DC bias voltage. This causes power to pass from the second input module to the common node. Thus, the switching logic module operates the switches to select power from either a first or second source based on the presence of the first and second AC power input waveforms.

In one embodiment, the first input module includes a first power rectifier that rectifies the first AC power input waveform and the second input module includes a second power rectifier that rectifies the second AC power input waveform such that a rectified power waveform is provided at the common node and the output node. In a further embodiment, the first input module senses an output of the first power rectifier to generate the first DC bias voltage and the second input module senses an output of the second power rectifier to generate the second DC bias voltage. In some embodiments the power rectifiers may be full-wave rectifiers.

The apparatus is further configured, in one embodiment, to include a power rectifier connected between the common node and the output node where the first AC power input waveform or the second AC power input waveform is applied at the common node and the output of the power rectifier includes a rectified AC power waveform at the output node. In a further embodiment, the first input module senses the first AC power input waveform and converts the first AC power input waveform to the first DC bias voltage and the second input module senses the second AC power input waveform and converts the second AC power input waveform to the second DC bias voltage.

In another embodiment, a rectified AC waveform derived from the first AC power input waveform is applied to a first opto-coupler to provide the first DC bias voltage to the switching logic module and a rectified AC waveform derived from the second AC power input waveform is applied to a second opto-coupler to provide the second DC bias voltage to the switching logic module. The first and second opto-couplers electrically isolate the first and second AC power input waveforms from the switching logic module. In a further embodiment, the first switch includes a first relay and second switch includes a second relay, the first and second relays including electromagnetic relays.

In yet a further embodiment, the apparatus may include a DC power source, a first logic switch, a second logic switch, and a third logic switch. A coil of the first relay may be connected to the DC power source and to the first logic switch such that closing the first logic switch closes the first relay. A coil of the second relay may be connected to the DC power source and to the second logic switch such that closing the second logic switch closes the second relay. The third logic switch may be connected to a drive input to the second logic switch such that closing the third logic switch prevents the second logic switch from closing.

Accordingly, the first logic switch closes in response to the presence of the first DC bias voltage from the first opto-coupler. The first logic switch opens in response to the absence of the first DC bias voltage from the first opto-coupler. The second logic switch closes in response to the presence of the second DC bias voltage from the second opto-coupler and absence of the first DC bias voltage from the first opto-coupler at a drive input to the third logic switch. The second logic switch opens in response to the presence of the first DC bias voltage from the first opto-coupler applied to a drive input to the third logic switch, where the third logic switch closes and prevents the second logic switch from closing, or the absence of the second DC bias voltage from the second opto-coupler. In certain embodiments, the first, second, and third logic switches are metal-oxide-semiconductor field-effect transistors ("MOSFETs").

In one embodiment, the first input module, the second input module, the first switch, the second switch, and the switching logic module include an input stage of a switching power supply. In another embodiment of the apparatus, the first input module receives, when present, a first AC power input waveform from a first power source and provides a first rectified AC waveform when the first AC power input waveform is present. In this embodiment, the second input module receives, when present, a second AC power input waveform from a second power source and provides a second rectified AC waveform when the second AC power input waveform is present.

The apparatus may include a first relay connecting the first input module to a common node and a second relay connecting the second input module to the common node, such that a power waveform at the common node provides power to an output node. The apparatus may further include a first isolation device that receives as input the first rectified AC waveform and provides a first DC bias voltage when the first AC power input waveform is present, and a second isolation device that receives as input the second rectified AC waveform and provides a second DC bias voltage when the second AC power input waveform is present. The first and second DC bias voltages are isolated from a ground of the first AC power input waveform.

The apparatus may further include a DC power source, a first logic switch, a second logic switch and a third logic switch with operation as described above.

A system of the present invention is also presented to provide AC power source redundancy. The system may include the various embodiments of the AC redundancy apparatus described above. Additionally, the system, in one embodiment, includes a switching power supply where the AC redundancy apparatus provides power to the switching power supply. In a further embodiment, the system may include an electronic device that receives power from the switching power supply.

A method of the present invention is also presented for providing AC power source redundancy. The method in the disclosed embodiments substantially includes the steps necessary to carry out the functions presented above with respect to the operation of the described apparatus and system. In one embodiment, the method includes receiving a first AC power input waveform from a first power source and determining whether the first AC power input waveform is present by sensing a first DC bias voltage generated from the first AC power input waveform. The method also may include receiving a second AC power input waveform from a second power source and determining whether the second AC power input waveform is present by sensing a second DC bias voltage generated from the second AC power input waveform.

The method may also include controlling a first switch and a second switch. The first switch connects a common node to the first AC power input waveform, and the second switch connects the common node to the second AC power input waveform. A power waveform at the common node provides power to an output node. Power at the output node is typically provided to another power supply stage.

The first and second switch are controlled by maintaining the first switch in a closed position and the second switch in an open position in response to the presence of the first DC bias voltage and the second DC bias voltage not being present, maintaining the first switch in a closed position and the second switch in an open position in response to the presence of the first DC bias voltage and the presence of the second DC bias voltage, and maintaining the first switch in an open position and the second switch in a closed position in response to the absence of the first DC bias voltage and the presence of the second DC bias voltage.

In a further embodiment, the method includes rectifying the first AC power input waveform and the second AC power input waveform, such that a rectified power waveform is provided at the common node and the output node. In yet a further embodiment, the method includes sensing the rectified first AC power input waveform to generate the first DC bias voltage and sensing the rectified second AC power waveform to generate the second DC bias voltage. The rectification is preferably full-wave rectification.

In another embodiment, one of the first AC power input waveform and the second AC power input waveform is applied at the common node and the waveform applied at the common node is rectified and passed to the output node such that a rectified AC power waveform is provided at the output node. In a further embodiment, the method includes converting the first AC power input waveform to the first DC bias voltage and converting the second AC power input waveform to the second DC bias voltage.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
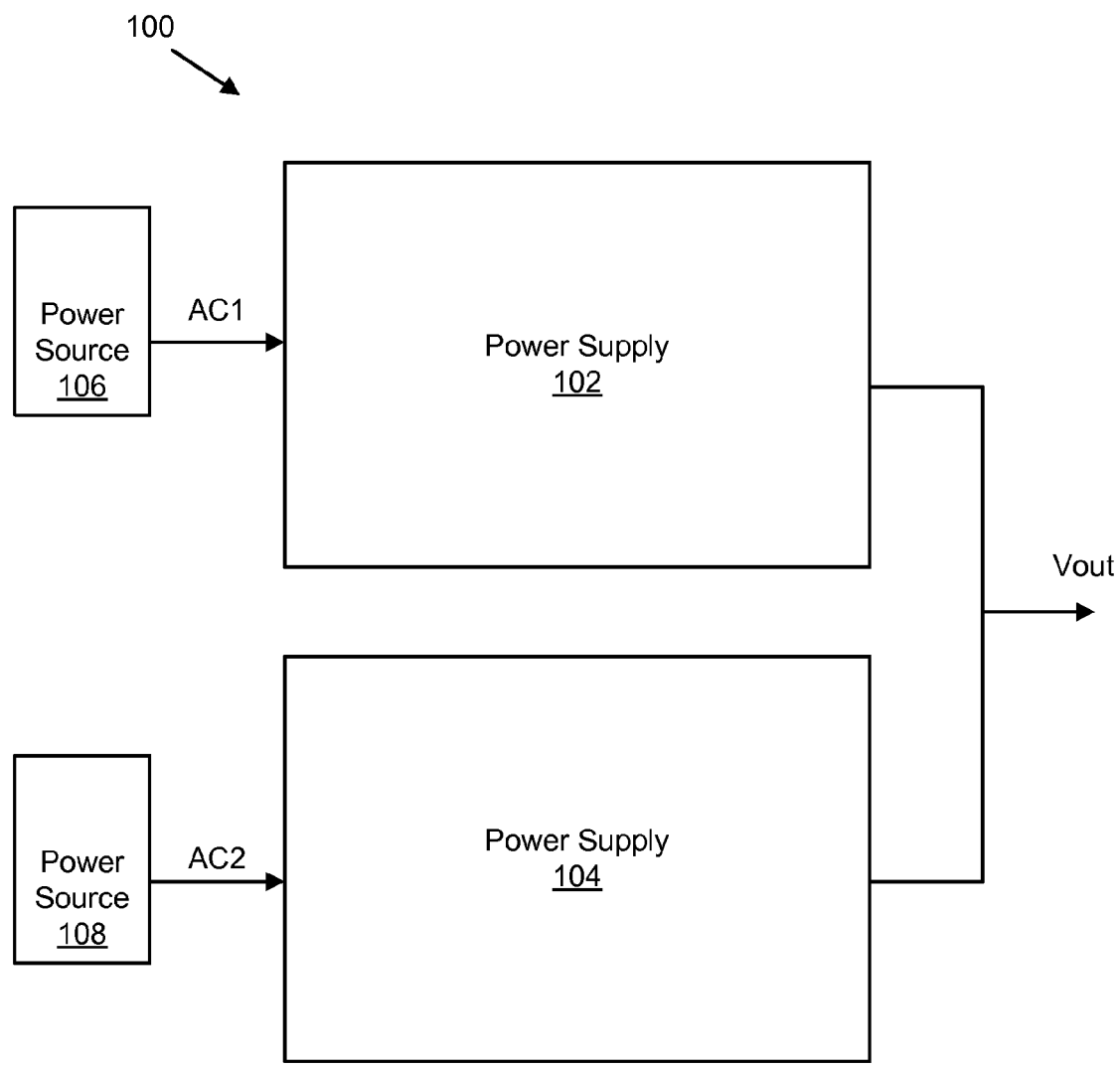
FIG. 1 is a schematic block diagram illustrating a prior art embodiment of a system with redundant AC power sources and redundant power supplies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Figure 2:
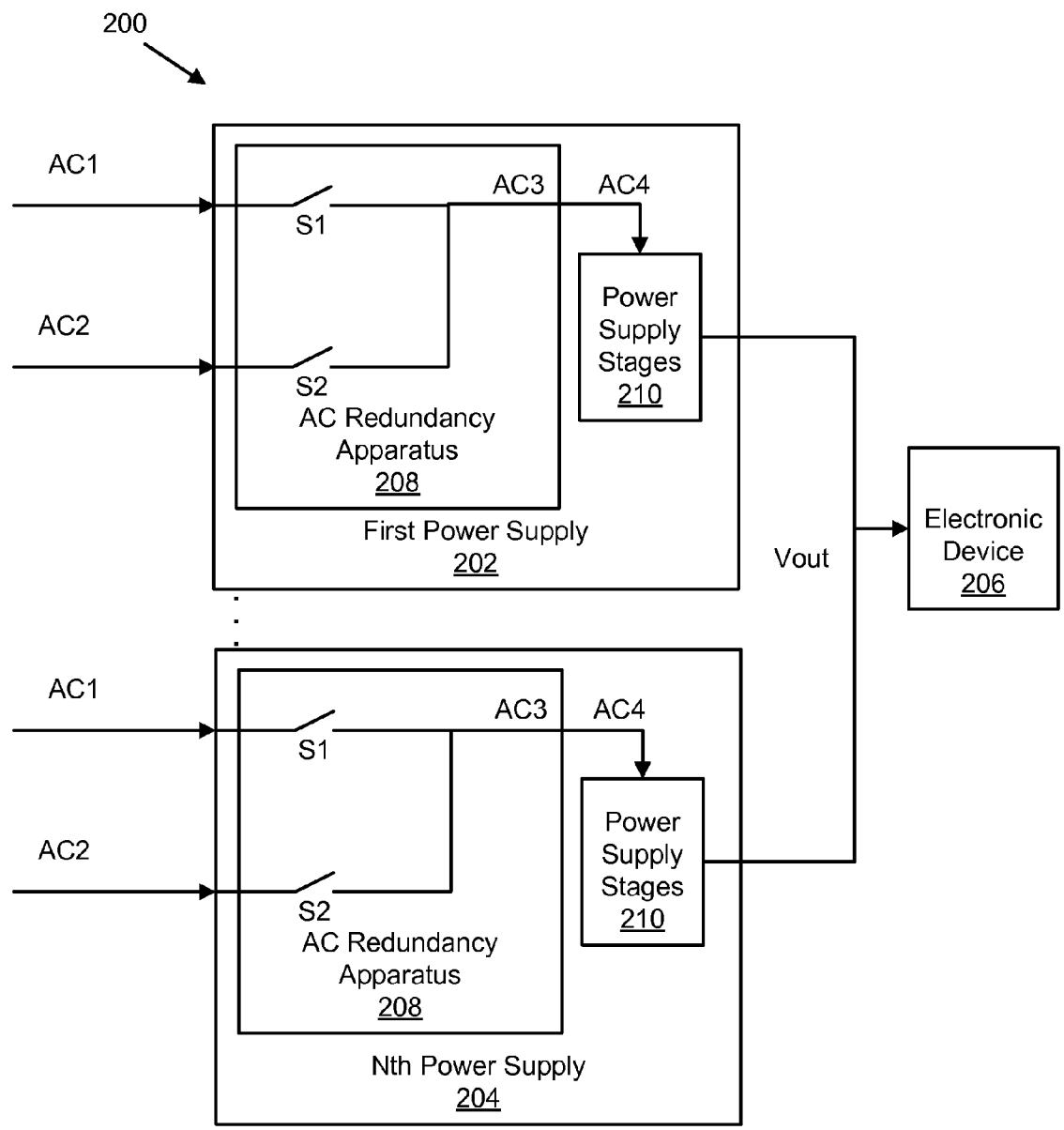
FIG. 2 is a schematic block diagram illustrating one embodiment of a system with redundant AC power sources in accordance with the present invention.

FIG. 2 is a schematic block diagram illustrating one embodiment of a system 200 with redundant AC power sources AC1, AC2 in accordance with the present invention. The system 100 includes one or more power supplies 202, 204, at least two redundant AC power input waveforms AC1, AC2, and an electronic device 206.

As depicted, the power supplies 202, 204 receive redundant power via the first and second AC power input waveforms AC1, AC2 and provide power to the electronic device 206. Preferably, the first and second AC power input waveforms are provided by two different AC power sources such as a wall socket and a backup battery feeding an inverter or a generator. In the depicted embodiment, power is provided to the electronic device 206 from a plurality of power supplies 202, 204 via an output signal Vout. In other embodiments, the electronic device 206 may receive power from a single power supply 202.

In the illustrated embodiment, the power supply 202 provides regulated power to the electronic device 206 to power various electronic systems and subsystems within the electronic device 206. The power supply 202, 204 is typically connected to the electronic device 206 by a regulated bus or similar device. The regulated bus and power supply 202, 204 may be configured to provide one or more different voltages and currents to the electronic device 206. For example, in a typical power supply, voltages of +12v, +5v, +3.3v, and −12 v are commonly provided. Preferably the power supply 202, 204 is a switching power supply. As will be recognized by those of skill in the art a switching power supply or switched-mode power supply ("SMPS") is a power supply that incorporates a switching regulator. A switching regulator regulates power by switching a metal-oxide-semiconductor field-effect transistor ("MOSFET") or other switch on and off with a variable duty cycle to produce a desired output signal.

In various embodiments, the electronic device 206 may be a computer system, such as a desktop, laptop, or server, and the power supply 202 may be configured to provide power to the various components of the computer system. In other embodiments, the electronic device 206 may include devices such as a blade server, a peripheral component interconnect ("PCI") card, routers, personal digital assistants (PDAs), switches, appliances, digital media players, displays, or other electronic devices as recognized by one of skill in the art. In one embodiment, the power supply 202, 204 may be implemented within the same enclosure as the electronic device 206, such as within a computer tower case. In other embodiments, the power supply 202, 204 may be implemented external to the electronic device 206 and may be connected to the electronic device 104 via a connection means such as a cord, cable, or bus such as in a blade center.

The electronic device 206 causes a load to be applied to the power supply 202, 204. The amount of load may affect the performance of the power supply 202, 204. The power supply 202, 204 is preferably configured to operate efficiently in conjunction with a specified load. In one embodiment, the load may vary depending on the operation characteristics of the electronic device 206 and the power supply 202, 204 may be configured to adjust accordingly. For example, the power supply 202, 204 may include a feedback signal for adjusting the power output characteristics of the power supply 202, 204 in response to changes in the load. Typically, the power supply 202, 204 regulates the voltage on the regulated bus so as to provide substantially constant voltage levels to the electronic device 206 under varying load conditions.

One or more power sources (not pictured) are configured to supply input power to the power supplies 202, 204 in the form of AC power input waveforms AC1, AC2. Typically, the power sources are a public utility or backup battery connected to an inverter or the like that provides power to homes and business via power lines. Power is then delivered to the power supply 202, 204 via a conventional wall socket or by other means known to those of skill in the art. In some embodiments, the power source may include a generator, backup power source, power supply, or other power component. The power supplies 202, 204 are configured to receive redundant AC power waveforms AC1, AC2 and to use the received AC power waveforms AC1, AC2 to generate and regulate one or more power waveforms for use by the electronic device 206.

Preferably, each power supply 202, 204 includes an AC redundancy apparatus 208 that provides the circuitry and logic for efficiently and cost effectively utilizing only one of the first and second AC power input waveforms AC1, AC2. The AC redundancy apparatus 208 controls a first switch S1 and a second switch S2 to select one of the AC power input waveforms AC1, AC2 to pass along to the additional stages 210 of the power supply 202, 204. By selecting only one of the redundant AC power input waveforms AC1, AC2 for use by the power supply 202, 204, AC redundancy is maintained, but problems that may result from the simultaneous use of two AC power waveforms AC1, AC2 are eliminated. For example, problems associated with out-of-phase AC power waveforms are eliminated.

In general, the AC redundancy apparatus 208 operates by detecting the presence of the first and second AC power input waveforms AC1, AC2 and selecting one of the waveforms for use based on their detected presence. For example, if only the first AC power input waveform AC1 is present or if both AC power input waveforms AC1, AC2 are present, the AC redundancy apparatus 208 may close the first switch S1 and open the second switch S2 such that the first AC power input waveform AC1, or a derivative thereof, is provided to the output node AC4. If only the second AC power input waveform AC2 is present (such as in the event of a failure of the source of the first AC power input waveform AC1), then the first switch S1 will be opened and the second switch S2 will be closed such that the second AC power input waveform AC2, or a derivative thereof, is provided to the output node AC4.

Additionally, rectification of the AC power input waveforms AC1, AC2 may be performed by the AC redundancy apparatus 208. In various embodiments, the rectified AC power input waveform may be used to power the logic circuitry and may be passed on in rectified form to the additional stages 210 of the power supply 202. A typical switching power supply 202 may include a conversion stage for converting the AC power waveform into a direct current ("DC") signal and an additional regulation stage for regulating the DC signal to some preferred voltage such as 12 volts. Typically a regulated DC voltage is passed to the electronic device 206.

Figure 3:
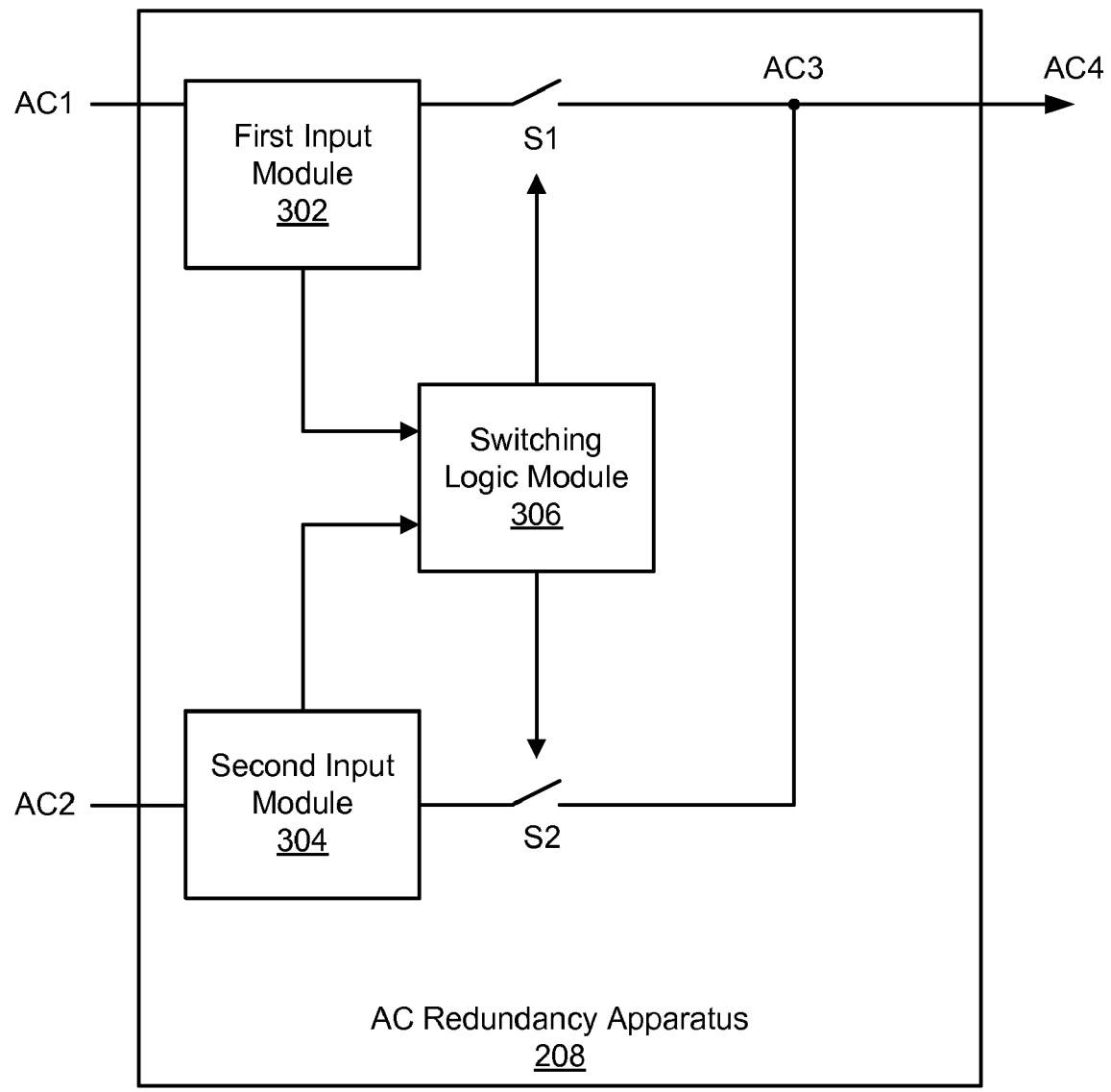
FIG. 3 is a schematic block diagram illustrating one embodiment of an apparatus for implementing a low cost, efficient system with redundant AC power sources in accordance with the present invention.

FIG. 3 is a schematic block diagram illustrating one embodiment of an AC redundancy apparatus 208 for implementing a low cost, efficient redundant AC power system in accordance with the present invention. In the depicted embodiment, the AC redundancy apparatus 208 includes a first input module 302, a second input module 304, and a switching logic module 306.

The first input module 302 is preferably configured to receive a first AC power input waveform AC1 from a first power source. The first input module 302 may include a first connector or the like for connecting the AC redundancy apparatus 208 to a first power source. The first input module 302 determines whether the first AC power input waveform AC1 is present by sensing a first DC bias voltage generated from the first AC power input waveform AC1. Similarly, the second input module 304 is configured to receive a second AC power input waveform AC2 from a second power source. The second input module 304 determines whether the second AC power input waveform AC2 is present by sensing a second DC bias voltage generated from the second AC power input waveform AC2.

Sensing a DC bias voltage typically means that circuitry or other computing means is used to receive the AC power input waveforms AC1, AC2, or a rectified version thereof, wherein the circuitry provides a DC bias voltage to control the first and second switches S1, S2 in response to presence or absence of the AC power input waveforms AC1, AC2. In a preferred embodiment, an opto-coupler or similar isolation device may be used to receive a rectified AC power input waveform, where the rectified waveform causes the opto-coupler to pass a DC signal to one or more logic switches that control the operation of the power switches S1, S2. An opto-coupler is a device that uses a short optical transmission path to transfer an electronic signal between elements of a circuit while keeping them electronically isolated. In another embodiment, a transformer is used to isolate as an isolation device. One of skill in the art will recognize other isolation devices and circuits.

In one embodiment, the first input module 302 may include a first power rectifier that rectifies the first AC power input waveform AC1, and the second input module 304 may include a second power rectifier that rectifies the second AC power input waveform AC2 such that a rectified power waveform is provided at the common node AC3 and the output node AC4. Preferably, the power rectifiers are full-wave rectifiers, but it is contemplated that half-wave rectifiers may be used in some embodiments. A "common node" as used herein is a node that connects the output of the first switch S1 with the output of the second switch S2. The output node AC4 is the node that provides the output waveform from the AC redundancy apparatus 208. In the embodiment where the first and second input modules 302, 304 each include a power rectifier, the common node AC3 may be connected directly to the output node AC4 or the common node AC3 may provide a rectified AC power waveform to the output node AC4. However, as will be discussed below additional power conversions may occur between the common node AC3 and the output node AC4 such as rectification.

In addition to being provided as an output power waveform, the rectified AC power input waveforms AC1, AC2 may be used to generate a DC voltage source for powering the logic circuitry of the switching logic module 306 and a DC component of the rectified AC power input waveforms may be used to determine the presence of the first and second AC power input waveforms AC1, AC2. For example, the first input module 302, may sense or utilize an output of the first power rectifier to generate a first DC bias voltage and the second input module 304 may sense an output of the second power rectifier to generate a second DC bias voltage. The first and second DC bias voltages may then be used to provide control signals to the power switches S1, S2 to selectively provide a power waveform to the output node AC4.

In one embodiment, the first input module 302 senses the first AC power input waveform AC1, when present, and converts the first AC power input waveform AC1 to a first DC bias voltage. Likewise the second input module 304 senses the second AC power input waveform AC2, when present, and converts the second AC power input waveform AC2 to a second DC bias voltage. Generation of the DC bias voltages typically includes rectification and in some cases smoothing of the rectified waveform.

In a further embodiment, a rectified AC waveform derived from the first AC power input waveform AC1 may be applied to a first opto-coupler to provide a first DC bias voltage to the switching logic module 306, and a rectified AC waveform derived from the second AC power input waveform AC1 may be applied to a second opto-coupler to provide a second DC bias voltage to the switching logic module 304.

In some instances, as noted above, additional operations such as rectification may be performed between the common node AC3 and the output node AC4. For example, a power rectifier may be connected between the common node AC3 and the output node AC4 such that the first AC power input waveform AC1 or the second AC power input waveform AC2, whichever is selected, is applied at the common node AC3. Then the signal may be rectified and passed to the output node AC4 such that the output of the power rectifier includes a rectified AC power waveform. In such an embodiment, even though the un-rectified first and second AC power input waveforms AC1, AC2 may be passed to the common node AC3 via the power switches S1, S2, an additional rectified waveform derived from the first and second AC power input waveforms AC1, AC2 may still be utilized to generate the first and second DC bias voltages and to provide power to the switching logic module 304. For example, the first and second AC power input waveforms AC1, AC2 may pass through to the first and second switches respectively S1, S2, but sensing circuitry in the first and second input modules 302, 304 may sense and rectify the first and second AC power input waveforms AC1, AC2 and the sensing circuitry may produce a first and a second DC bias voltage.

The switching logic module 306 controls the operation of the first and second switches S1, S2 to determine which power waveform AC1, AC2, or derivative thereof, will be provided to the common node AC3. In operation, the switching logic module 306 maintains the first switch S1 in a closed position and the second switch S2 in an open position in response to the presence of the first DC bias voltage and the second DC bias voltage not being present. The presence of the first DC bias voltage indicates the presence of the first AC power input waveform AC1 at the first input module 304, and the presence of the second DC bias voltage indicates presence of the second AC power input waveform AC2 at the second input module 304. Closing the first switch S1 and opening the second switch S2 causes AC power present at the first input module 302 to pass from the first input module 302 to the common node AC3. Thus if only the first AC power input waveform AC1 is present, it is selected for use by the power supply 202, 204.

Next, the switching logic module 306 maintains the first switch S2 in a closed position and the second switch S2 in an open position in response to the presence of the first DC bias voltage and the presence of the second DC bias voltage. Again, this causes AC power AC1 present at the first input module 302 to pass from the first input module 302 to the common node 304 and prevents AC power AC2 present at the second input module 304 from being passed to the common node AC3, even though both AC power input waveforms AC1, AC2 are present. Thus the first AC power input waveform AC1 is selected for use by the power supply 202, 204 when both AC power input waveforms AC1, AC2 are present.

Finally, the switching logic module 306 maintains the first switch S1 in an open position and the second switch S2 in a closed position in response to the first DC bias voltage not being present and the second DC bias voltage being present. This causes AC power present at the second input module 304 to pass from the second input module 304 to the common node AC3. Thus the second AC power input waveform AC2 is selected for use by the power supply 202, 204 if the first AC power input waveform AC1 is not present. In this manner, the switching logic module 306 operates the switches S1, S2 to select power from either a first or second source based on the presence of the first and second AC power input waveforms AC1, AC2. This provides AC redundancy while increasing the efficiency of the system 200.

In one embodiment, the first and second input modules 302, 304 determine that the first and second AC power input waveforms are present or not by determining that an AC voltage is above a threshold. For example, the first input module 302 may determine that the first AC power input waveform is present if above 70 volts. In one embodiment, an AC power input waveform may be below a threshold such that control circuitry in the input modules 302, 304 and/or switching logic module 306 may not operate, may not close a switch, etc. In another embodiment, circuits in the input modules 302, 304 and/or switching logic module 306 may shut down, pull a signal low, etc. when an AC power input waveform is below a threshold. One of skill in the art will recognize other ways to determine if an AC power input waveform AC1, AC2 is present or not when partially present.

Figure 4:
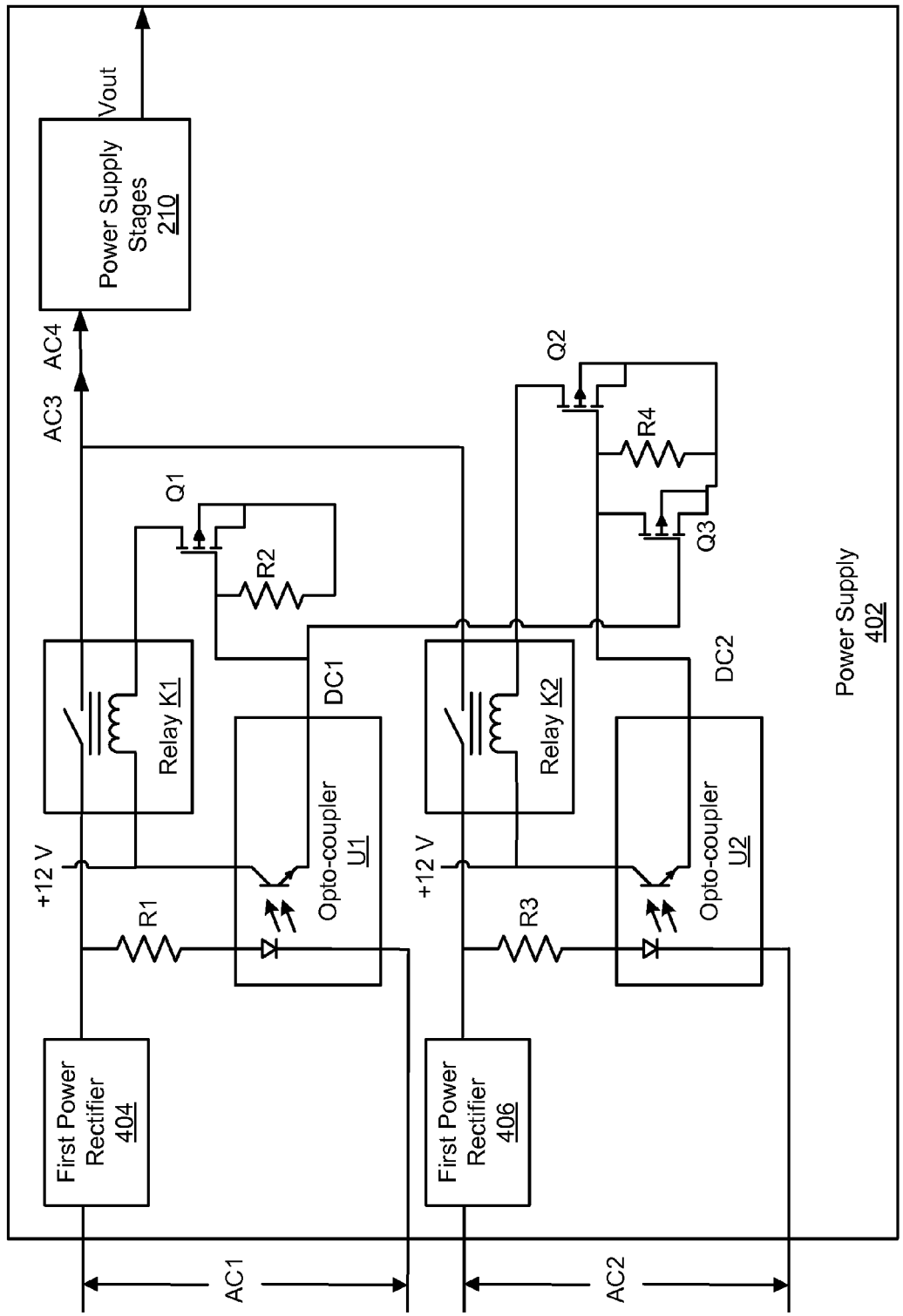
FIG. 4 is a schematic block diagram illustrating a detailed embodiment of a power supply with redundant AC power sources in accordance with the present invention.

FIG. 4 is a schematic block diagram illustrating one detailed embodiment of a power supply 402 with redundant AC power sources in accordance with the present invention. In the depicted embodiment, the first input module 302, the second input module 304, and the switching logic module 306 are implemented in the depicted circuitry. For example, the first and second input modules 302, 304 may include a connector (not pictured), a first power rectifier 404, a second power rectifier 406, resistors R1, R3 and a first and second opto-coupler U1, U2. The first power rectifier 404 is connected to a first relay K1, which is connected to the common node AC3. The second power rectifier 406 is connected to a second relay K2, which is connected to the common node AC3. In the depicted embodiment, the common node AC3 is connected to the output node AC4, which is connected to the power supply stages 210, which supply a regulated DC voltage Vout. The switching logic module 306 may include resistors R2, R4, and logic switches Q1, Q2, Q3. The +12 volt DC voltage is preferably derived from one or both of the AC power input waveforms AC1, AC2. Preferably, the logic switches Q1, Q2, Q3 are MOSFET.

In operation, the power supply 402 receives the first and second AC power input waveforms AC1, AC2 as inputs. The first and second AC power input waveforms AC1, AC2 are rectified by the first and second power rectifiers 404, 406, respectively. The rectified first AC power input waveform is passed to the first relay K1. When the first relay K1 is closed, the rectified first AC power input waveform passes through the first relay K1 to the common node AC3. The rectified second AC power input waveform is passed to the second relay K2. When the second relay K2 is closed, the rectified second AC power input waveform passes through the second relay K2 to the common node AC3. The rectified first AC power input waveform is sensed in resistor R1 and is passed to the input of the first opto-coupler U1. A first DC bias voltage DC1 is present on the output of the first opto-coupler U1 when the first AC power input waveform AC1 is present. The rectified second AC power input waveform is sensed in resistor R3 and is passed to the input of the second opto-coupler U2. A second DC bias voltage DC2 is present on the output of the second opto-coupler U2 when the second AC power input waveform AC2 is present. Depending on whether the rectified waveforms are present, the opto-couplers U1, U2 will cause a DC bias voltage DC1, DC2 to be applied to the input of one or more of the first, second, and third, logic switches Q1, Q2, Q3.

A coil of the first relay K1 is connected to the +12 volt DC power source and to the first logic switch Q1 such that closing the first logic switch Q1 closes the first relay K1. Similarly, a coil of the second relay K2 is connected to the +12 volt DC power source and to the second logic switch Q2 such that closing the second logic switch Q2 closes the second relay K2. The relays K1, K2 are preferably electromagnetic relays that operate to open and close in response to a current passing through a coil of the relays K1, K2. The third logic switch Q3 is connected to a drive input to the second logic switch Q2 such that closing the third logic switch Q3 pulls the drive input (i.e. gate) of the second logic switch Q2 to ground which prevents the second logic switch Q2 from closing even if the second AC power input waveform AC2 is present. Note that switches Q1, Q2, and Q3 are shown as MOSFETs, but may be other types switches or semiconductor switches.

Thus, the first logic switch Q1 closes in response to the presence of the first DC bias voltage DC1 from the first opto-coupler U1, and the first logic switch Q1 opens in response to the absence of the first DC bias voltage DC1 from the first opto-coupler U1. The second logic switch Q2 closes in response to the presence of the second DC bias voltage DC2 from the second opto-coupler U2 and absence of the first DC bias voltage DC1 from the first opto-coupler U1 at a drive input to the third logic switch Q3. The second logic switch Q2 opens in response to either the presence of the first DC bias voltage DC1 from the first opto-coupler U1 applied to a drive input to the third logic switch Q3 (the third logic switch closing and preventing the second logic switch from closing), and the absence of the second DC bias voltage DC2 from the second opto-coupler U2. In this manner, the first AC power waveform AC1 or second AC power waveforms AC2 is selected for use by the power supply 402, and a rectified derivative of the selected waveform is passed to the additional stages of the power supply 210.

Figure 5:
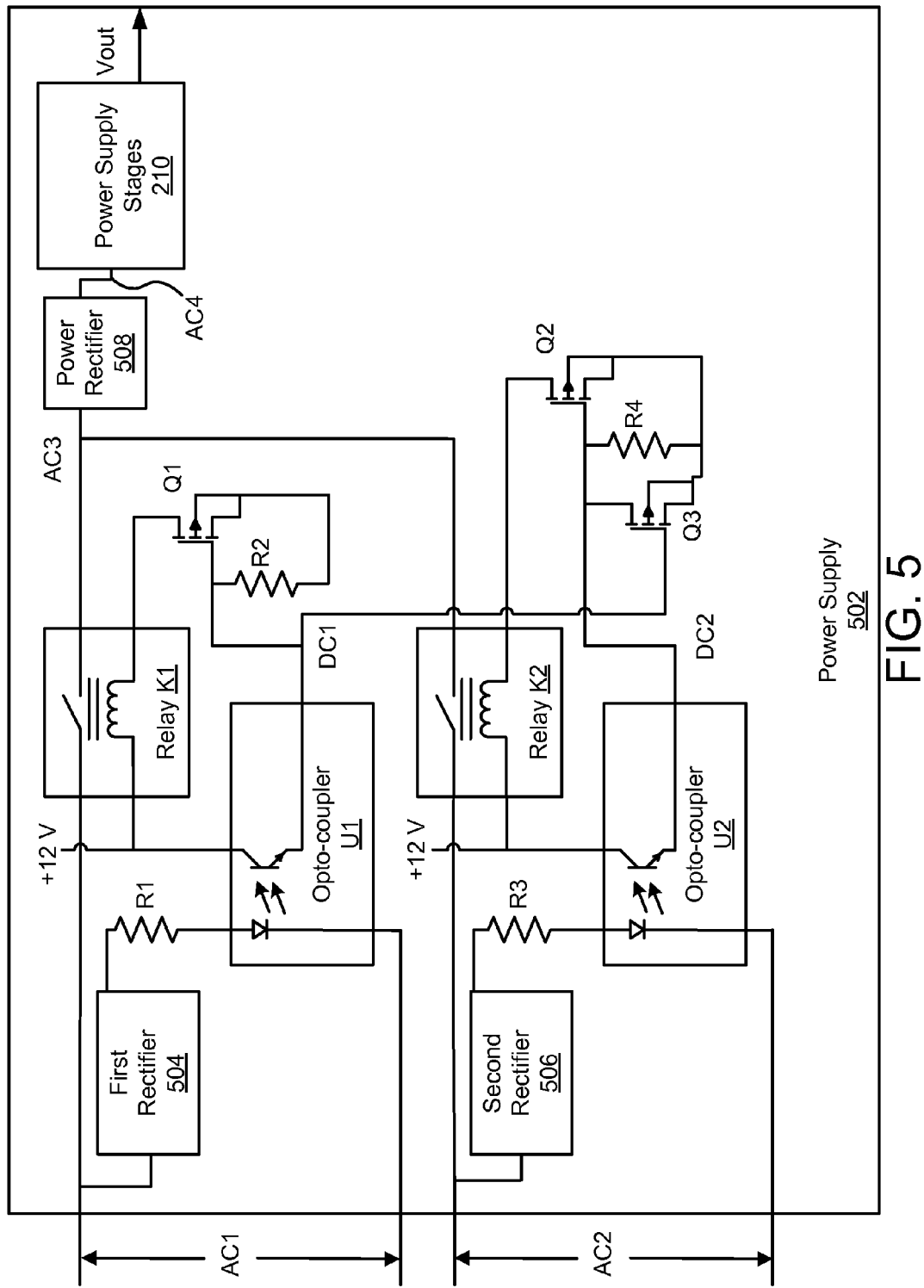
FIG. 5 is a schematic block diagram illustrating another detailed embodiment of a power supply with redundant AC power sources in accordance with the present invention.

FIG. 5 is a schematic block diagram illustrating another detailed embodiment of a power supply 502 with redundant AC power sources in accordance with the present invention. The depicted embodiment is similar to that depicted in FIG. 4, except that the AC power input waveforms AC1, AC2 are provided directed to the first and second relays K1, K2 without rectification. Instead, a first and second rectifier 504, 506 are provided on the opto-coupler branch. Thus, the selected first or second AC power input waveform AC1, AC2 is passed through the corresponding first or second relay K1, K2 in an un-rectified form.

In one embodiment, an additional power rectifier 508 may be provided between the common node AC3 and the output node AC4 such that a rectified waveform is provided to the addition power supply stages 210. In another embodiment, the power rectifier 508 between the common node AC3 and the output node AC4 may be left out such that the un-rectified AC power input waveform AC1, AC2 is passed directly to the power supply stages 210. In some cases, rectification of the AC power input waveform AC1, AC2 may occur within the additional power supply stages 210 or where rectification is not required.

In one embodiment, the first and second rectifiers 504, 506 are full-wave rectifiers. In another embodiment, the first and second rectifiers 504, 506 are half-wave rectifiers. In other embodiments, the first and second rectifiers 504, 506 may be the resistors R1, R3 and input stages of the first and second opto-couplers U1, U2 where the opto-couplers U1, U2 present a diode function as an input. One of skill in the art will recognize other ways to sense and AC voltage or current and to derive a DC bias signal from the AC voltage or current. The invention contemplates any first and second input modules 302, 304 that sense an AC waveform and provide a DC bias signal in the presence of the AC waveform.

In the embodiments depicted in FIGS. 3-5, the circuits are typically designed to sense full-rectified AC waveforms or half-rectified AC waveforms and to not react to an AC waveform varying from a peak voltage to zero voltage. For example, time constants in the input modules 302, 304 and switching logic module 306 typically are typically long enough to hold the first and second relays U1, U2 in a desired position through AC waveform fluctuations of the period of the AC waveform. In one embodiment, for a 60 Hz system, the input modules 302, 304 and/or switching logic module 306 may have time constants that are at least 2 periods or about 33 milliseconds. One of skill in the art will recognize how to prevent unwanted switching of the first and second switches K1, K2.

Figure 6:
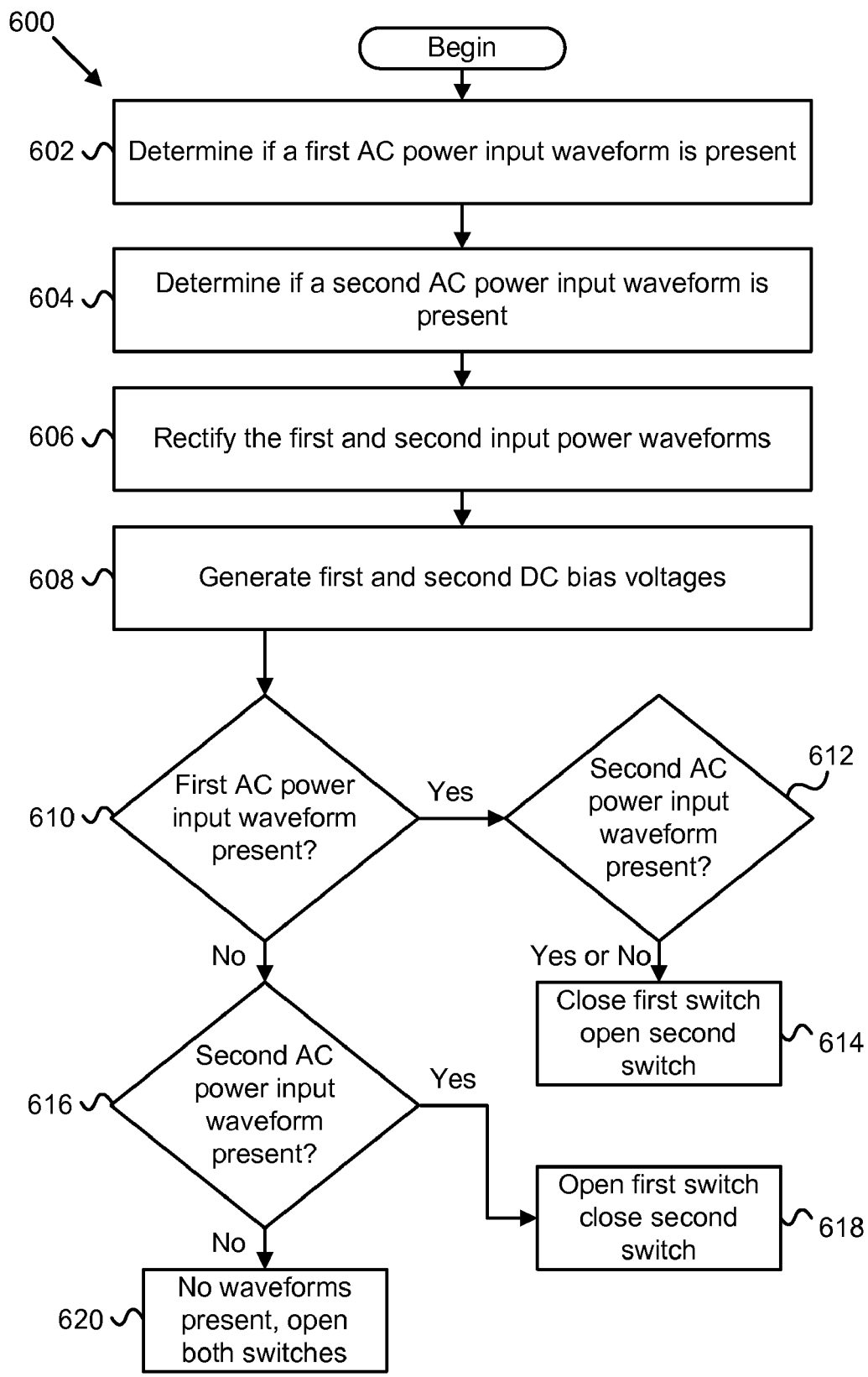
FIG. 6 is a schematic flow chart diagram illustrating one embodiment of a method for providing redundant AC power sources in accordance with the present invention.

FIG. 6 is a schematic flow chart diagram illustrating one embodiment of a method 600 for providing redundant AC power sources in accordance with the present invention. The method 600 may differ from the depicted embodiment to include additional steps or reorder the steps to include the various embodiments described above with regard to FIGS. 2-5.

The method 600 begins and the first input module determines 602 whether the first AC power input waveform AC1 is present by sensing a first direct current ("DC") bias voltage DC1 generated from the first AC power input waveform AC1. Typically, this is accomplished by applying a rectified form of the first AC power input waveform AC1 to an opto-coupler to provide a control signal to one or more logic switches Q1, Q2, Q3.

Next, the second input module 304 determines 604 whether a second AC power input waveform AC2 is present by sensing a second DC bias voltage DC2 generated from the second AC power input waveform AC2. In one embodiment, the first and second AC power input waveforms AC1, AC2 are rectified 606 by a first and second power rectifier 404, 406, and first and second DC bias voltages DC1, DC2 are generated 608 from the rectified waveforms. In another embodiment, the first and second AC power input waveforms AC1, AC2 are rectified 606 by a first and second rectifier 504, 506, and first and second DC bias voltages DC1, DC2 are generated 608 from the rectified waveforms while one the first and second AC power input waveforms AC1, AC2 is passed to a power rectifier 508 between the common node AC3 and output node AC4.

A first switch K1 and a second switch K2 are controlled 610-620 by a switching logic module 306 to select one of the AC power input waveforms AC1, AC2, or a derivative thereof, to an output node AC4. The first switch K1 connects a common node AC3 to the first AC power input waveform AC1, the second switch connects the common node AC3 to the second AC power input waveform AC2. The switches K1 and K2 are controlled based on the determination of the presence of the first and second AC power input waveforms AC1, AC2.

The switching logic module 306 determines 610 if the first AC power input waveform is present and determines 612, 616 if the second AC power waveform AC2 is present. If the switching logic module 306 determines 610 that the first AC power input waveform AC1 is present, then no matter whether the second AC power input waveform AC2 is determined 612, 616 to be present or not, the switching logic module 306 maintains 614 the first switch K1 in a closed position and the second switch in an opened position. Thus, power from the first AC power waveform AC1 is passed to the output node AC4.

If the switching logic module 306 determines 610 that the first AC power input waveform AC1 is not present, and is the switching logic module 306 determines 616 that the second AC power input waveform AC2 is present, then the switching logic module 306 maintains 618 the first switch K1 in an open position and the second switch K2 in a closed position. Thus, power from the second AC power waveform AC2 is passed to the output node AC4.

If is the switching logic module 306 determines 610 that the first AC power input waveform AC1 is not present, and determines 616 that the second AC power input waveform AC2 is also not present, then the switching logic module 306, in one embodiment, maintains 620 the first switch K1 in an open position and the second switch K2 in an open position 620 and no AC power is available to the power supply 402.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus that provides alternating current ("AC") power source redundancy, the apparatus comprising:
a first input module configured to receive a first AC power input waveform from a first power source, the first input module determining whether the first AC power input waveform is present by sensing a first direct current ("DC") bias voltage generated from the first AC power input waveform;
a second input module configured to receive a second AC power input waveform from a second power source, the second input module determining whether the second AC power input waveform is present by sensing a second DC bias voltage generated from the second AC power input waveform;
a first switch connecting the first input module to a common node;
a second switch connecting the second input module to the common node, wherein a power waveform at the common node provides power to an output node;
a switching logic module that controls the first switch and the second switch,
the switching logic module maintaining the first switch in a closed position and the second switch in an open position in response to the presence of the first DC bias voltage and the second DC bias voltage not being present,
the switching logic module maintaining the first switch in a closed position and the second switch in an open position in response to the presence of the first DC bias voltage and the presence of the second DC bias voltage, and
the switching logic module maintaining the first switch in an open position and the second switch in a closed position in response to the first DC bias voltage not being present and the presence of the second DC bias voltage,
wherein a rectified AC waveform derived from the first AC power input waveform is applied to a first opto-coupler to provide the first DC bias voltage to the switching logic module and a rectified AC waveform derived from the second AC power input waveform is applied to a second opto-coupler to provide the second DC bias voltage to the switching logic module, the first and second opto-couplers electrically isolating the first and second AC power input waveforms from the switching logic module, and
wherein the first switch comprises a first relay and second switch comprises a second relay, the first and second relays comprising electromagnetic relays; and
a DC power source, a first logic switch, a second logic switch, and a third logic switch, a coil of the first relay connected to the DC power source and to the first logic switch such that closing the first logic switch closes the first relay, a coil of the second relay connected to the DC power source and to the second logic switch such that closing the second logic switch closes the second relay, the third logic switch connected to a drive input to the second logic switch such that closing the third logic switch prevents the second logic switch from closing, wherein
the first logic switch closes in response to the presence of the first DC bias voltage from the first opto-coupler,
the first logic switch opens in response to the absence of the first DC bias voltage from the first opto-coupler,
the second logic switch closes in response to the presence of the second DC bias voltage from the second opto-coupler and absence of the first DC bias voltage from the first opto-coupler at a drive input to the third logic switch, and
the second logic switch opens in response to one of the presence of the first DC bias voltage from the first opto-coupler applied to a drive input to the third logic switch, the third logic switch closing and preventing the second logic switch from closing, and the absence of the second DC bias voltage from the second opto-coupler.

2. The apparatus of claim 1, wherein the first input module further comprises a first power rectifier that rectifies the first AC power input waveform and the second input module further comprises a second power rectifier that rectifies the second AC power input waveform wherein a rectified power waveform is provided at the common node and the output node.

3. The apparatus of claim 2, wherein the first input module senses an output of the first power rectifier to generate the first DC bias voltage and the second input module senses an output of the second power rectifier to generate the second DC bias voltage.

4. The apparatus of claim 3, wherein the first and second power rectifiers comprises full-wave rectifiers.

5. The apparatus of claim 1, further comprising a power rectifier connected between the common node and the output node wherein one of the first AC power input waveform and the second AC power input waveform is applied at the common node and the output of the power rectifier comprises a rectified AC power waveform at the output node.

6. The apparatus of claim 5, wherein the first input module senses the first AC power input waveform and converts the first AC power input waveform to the first DC bias voltage and the second input module senses the second AC power input waveform and converts the second AC power input waveform to the second DC bias voltage.

7. The apparatus of claim 1, wherein the first, second, and third logic switches comprise metal-oxide-semiconductor field-effect transistors ("MOSFETs").

8. The apparatus of claim 1, wherein the first input module, the second input module, the first switch, the second switch, and the switching logic module comprise an input stage of a switching power supply.

9. A system to provide alternating current ("AC") power source redundancy in a power supply, the system comprising:
a switching power supply;
an AC redundancy apparatus that provides power to the power supply, the AC redundancy apparatus comprising:
a first input module configured to receive a first AC power input waveform from a first power source the first input module determining whether the first AC power input waveform is present by sensing a first direct current ("DC") bias voltage generated from the first AC power input waveform;
a second input module configured to receive a second AC power input waveform from a second power source, the second input module determining whether the second AC power input waveform is present by sensing a second DC bias voltage generated from the second AC power input waveform;
a first switch connecting the first input module to a common node;
a second switch connecting the second input module to the common node, wherein a power waveform at the common node provides power to an output node;
a switching logic module that controls the first switch and the second switch, the switching logic module maintaining the first switch in a closed position and the second switch in an open position in response to the presence of the first DC bias voltage and the second DC bias voltage not being present, the switching logic module maintaining the first switch in a closed position and the second switch in an open position in response to the presence of the first DC bias voltage and the presence of the second DC bias voltage, and the switching logic module maintaining the first switch in an open position and the second switch in a closed position in response to the first DC bias voltage not being present and the presence of the second DC bias voltage, wherein a rectified AC waveform derived from the first AC power input waveform is applied to a first opto-coupler to provide the first DC bias voltage to the switching logic module and a rectified AC waveform derived from the second AC power input waveform is applied to a second opto-coupler to provide the second DC bias voltage to the switching logic module, the first and second opto-couplers electrically isolating the first and second AC power input waveforms from the switching logic module, and wherein the first switch comprises a first relay and second switch comprises a second relay, the first and second relays comprising electromagnetic relays; and a DC power source, a first logic switch, a second logic switch, and a third logic switch, a coil of the first relay connected to the DC power source and to the first logic switch such that closing the first logic switch closes the first relay, a coil of the second relay connected to the DC power source and to the second logic switch such that closing the second logic switch closes the second relay, the third logic switch connected to a drive input to the second logic switch such that closing the third logic switch prevents the second logic switch from closing, wherein the first logic switch closes in response to the presence of the first DC bias voltage from the first opto-coupler, the first logic switch opens in response to the absence of the first DC bias voltage from the first opto-coupler, the second logic switch closes in response to the presence of the second DC bias voltage from the second opto-coupler and absence of the first DC bias voltage from the first opto-coupler at a drive input to the third logic switch, and the second logic switch opens in response to one of the presence of the first DC bias voltage from the first opto-coupler applied to a drive input to the third logic switch, the third logic switch closing and preventing the second logic switch from closing, and the absence of the second DC bias voltage from the second opto-coupler.

10. The system of claim 9, further comprising an electronic device wherein the switching power supply provides power to the electronic device.

11. A method for providing alternating current ("AC") power source redundancy, the method comprising:
determining whether a first AC power input waveform is present by sensing a first direct current ("DC") bias voltage generated from the first AC power input waveform;

determining whether a second AC power input waveform is present by sensing a second DC bias voltage generated from the second AC power input waveform; and controlling a first switch and a second switch, the first switch connecting a common node to the first AC power input waveform, the second switch connecting the common node to the second AC power input waveform, wherein a power waveform at the common node provides power to an output node, controlling the first and second switch comprising maintaining the first switch in a closed position and the second switch in an open position in response to the presence of the first DC bias voltage and the second DC bias voltage not being present, maintaining the first switch in a closed position and the second switch in an open position in response to the presence of the first DC bias voltage and the presence of the second DC bias voltage, and maintaining the first switch in an open position and the second switch in a closed position in response to the first DC bias voltage not being present and the presence of the second DC bias voltage, wherein a rectified AC waveform derived from the first AC power input waveform is applied to a first opto-coupler to provide the first DC bias voltage to the switching logic module and a rectified AC waveform derived from the second AC power input waveform is applied to a second opto-coupler to provide the second DC bias voltage to the switching logic module, the first and second opto-couplers electrically isolating the first and second AC power input waveforms from the switching logic module, and wherein the first switch comprises a first relay and second switch comprises a second relay, the first and second relays comprising electromagnetic relays;

connecting a coil of the first relay to a DC power source and to a first logic switch such that closing the first logic switch closes the first relay;

connecting a coil of the second relay to the DC power source and to a second logic switch such that closing the second logic switch closes the second relay; and connecting a third logic switch to a drive input to the second logic switch such that closing the third logic switch prevents the second logic switch from closing, wherein the first logic switch closes in response to the presence of the first DC bias voltage from the first opto-coupler, the first logic switch opens in response to the absence of the first DC bias voltage from the first opto-coupler, the second logic switch closes in response to the presence of the second DC bias voltage from the second opto-coupler and absence of the first DC bias voltage from the first opto-coupler at a drive input to the third logic switch, and the second logic switch opens in response to one of the presence of the first DC bias voltage from the first opto-coupler applied to a drive input to the third logic switch, the third logic switch closing and preventing the second logic switch from closing, and the absence of the second DC bias voltage from the second opto-coupler.

12. The method of claim 11, further comprising rectifying the first AC power input waveform and the second AC power input waveform, wherein a rectified power waveform is provided at the common node and the output node.

13. The method of claim 12, further comprising sensing the rectified first AC power input waveform to generate the first DC bias voltage and sensing the rectified second AC power waveform to generate the second DC bias voltage.

14. The method of claim 13, wherein the rectification is full-wave rectification.

15. The method of claim 11, wherein one of the first AC power input waveform and the second AC power input waveform is applied at the common node and wherein the waveform applied at the common node is rectified and passed to the output node such that a rectified AC power waveform is provided at the output node.

16. An apparatus that provides alternating current ("AC") power source redundancy, the apparatus comprising:
- a first input module that receives, when present, a first AC power input waveform from a first power source and provides a first rectified AC waveform when the first AC power input waveform is present;
- a second input module that receives, when present, a second AC power input waveform from a second power source and provides a second rectified AC waveform when the second AC power input waveform is present;
- a first relay connecting the first input module to a common node;
- a second relay connecting the second input module to the common node, wherein a power waveform at the common node provides power to an output node;
- a first isolation device that receives as input the first rectified AC waveform and provides a first DC bias voltage when the first AC power input waveform is present, the first DC bias voltage isolated from a ground of the first AC power input waveform;
- a second isolation device that receives as input the second rectified AC waveform and provides a second DC bias voltage when the second AC power input waveform is present, the second DC bias voltage isolated from a ground of the second AC power input waveform;
- a DC power source;
- a first logic switch;
- a second logic switch; and
- a third logic switch, wherein a coil of the first relay is connected to the DC power source and to the first logic switch such that closing the first logic switch closes the first relay, a coil of the second relay is connected to the DC power source and to the second logic switch such that closing the second logic switch closes the second relay, the third logic switch is connected to a drive input to the second logic switch such that closing the third logic switch prevents the second logic switch from closing, and wherein
- the first logic switch closes in response to the presence of the first DC bias voltage;
- the first logic switch opens in response to the first DC bias voltage not being present;
- the second logic switch closes in response to the presence of the second DC bias voltage and the first DC bias voltage at a drive input to the third logic switch not being present; and
- the second logic switch opens in response to one of
  - the presence of the first DC bias applied to a drive input to the third logic switch, the third logic switch closing and preventing the second logic switch from closing, and
  - the second DC bias voltage not being present.

* * * * *